United States Patent
Takata et al.

(10) Patent No.: US 11,277,757 B2
(45) Date of Patent: Mar. 15, 2022

(54) TERMINAL, BASE STATION, TRANSMISSION METHOD, AND RECEPTION METHOD

(71) Applicant: Panasonic Intellectual Property Corporation of America, Torrance, CA (US)

(72) Inventors: Tomohumi Takata, Ishikawa (JP); Takashi Iwai, Ishikawa (JP); Shotaro Maki, Tokyo (JP); Yihui Li, Singapore (SG)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 9 days.

(21) Appl. No.: 16/643,766

(22) PCT Filed: Aug. 22, 2018

(86) PCT No.: PCT/JP2018/030937
§ 371 (c)(1),
(2) Date: Mar. 2, 2020

(87) PCT Pub. No.: WO2019/069572
PCT Pub. Date: Apr. 11, 2019

(65) Prior Publication Data
US 2020/0229001 A1    Jul. 16, 2020

(30) Foreign Application Priority Data

Oct. 6, 2017   (JP) ............... JP2017-196004

(51) Int. Cl.
*H04W 52/10*    (2009.01)
*H04W 16/28*    (2009.01)
(Continued)

(52) U.S. Cl.
CPC ........... *H04W 16/28* (2013.01); *H04L 5/0051* (2013.01); *H04L 25/0226* (2013.01);
(Continued)

(58) Field of Classification Search
CPC . H04W 52/146; H04W 52/08; H04W 52/242; H04W 52/10; H04W 52/38;
(Continued)

(56) References Cited

U.S. PATENT DOCUMENTS

| | | | | |
|---|---|---|---|---|
| 2012/0087334 A1* | 4/2012 | Suzuki | ............... | H04L 5/0091 370/329 |
| 2019/0190747 A1* | 6/2019 | Park | .................... | H04B 7/0486 |

OTHER PUBLICATIONS

International Search Report of PCT application No. PCT/JP2018/030937 dated Oct. 23, 2018.
(Continued)

*Primary Examiner* — Tu X Nguyen
(74) *Attorney, Agent, or Firm* — Seed IP Law Group LLP

(57) ABSTRACT

In a terminal, a transmission power calculation unit calculates a transmission power of an uplink signal by using transmission power control information indicating one value from among a plurality of candidate values respectively associated with correction values that correct a control value to use in a closed loop control of the transmission power. A wireless transmission unit transmits the uplink signal with the above transmission power. A first correction value and a second correction value having a larger step size than the first correction value are associated with each of the plurality of candidate values.

12 Claims, 12 Drawing Sheets

| TPC COMMAND FIELD IN DCI FORMAT 0/0A/0B/3/4/4A/4B/6-0A/3B | ACCUMULATED $\delta_{PUSCH,c}$ [dB] | ABSOLUTE $\delta_{PUSCH,c}$ [dB] ONLY DCI FORMAT 0/0A/0B/4/4A/4B/6-0A |
|---|---|---|
| 0 | -1 | -4 |
| 1 | 0 | -1 |
| 2 | 1 | 1 |
| 3 | 3 | 4 |

(51) Int. Cl.
  *H04L 5/00* (2006.01)
  *H04L 25/02* (2006.01)
  *H04W 52/08* (2009.01)
  *H04W 52/14* (2009.01)
  *H04W 72/04* (2009.01)

(52) U.S. Cl.
  CPC ......... *H04W 52/08* (2013.01); *H04W 52/146* (2013.01); *H04W 72/042* (2013.01)

(58) Field of Classification Search
  CPC ... H04W 16/28; H04W 52/221; H04W 52/36; H04W 72/046; H04W 52/362; H04W 52/58; H04W 52/04; H04W 52/143; H04W 52/228; H04W 40/08; H04W 40/10; H04W 52/18; H04W 52/226; H04W 52/06; H04W 52/12; H04W 52/32; H04W 52/545; H04W 52/367; H04W 52/34; H04B 7/0695; H04B 7/0617; H04B 7/0413; H04B 7/088; H04B 7/0639; H04B 7/0404; H04B 7/0408; H04B 2001/0416
  See application file for complete search history.

(56) References Cited

OTHER PUBLICATIONS

R1-1716114, "Power control framework for PUSCH", 3GPP TSG RAN WG1 NR Ad-Hoc Meeting, Sep. 2017.
3GPP TS 36.213 version 14.3.0 Release 14, "LTE; Evolved Universal Terrestrial Radio Access (E-UTRA); Physical layer procedures", Jun. 2017.
R1-1712962, "Considerations on Multiple TRP/Panel Transmission", 3GPP TSG-RAN WG1 #90, Aug. 2017.
R4-1707512, "CDF requirements for mmWave UEs", 3GPP TSG-RAN WG4 Meeting #84, Aug. 2017.
R1-1718652, "NR power control framework", 3GPP TSG-RAN WG1 #90bis, Oct. 2017.
R1-1718692, "Discussion on NR power control framework", 3GPP TSG RAN WG1 Meeting 90bis, Oct. 2017.

* cited by examiner

FIG. 1

| TPC COMMAND FIELD IN DCI FORMAT 0/0A/0B/3/4/4A/4B/6-0A/3B | ACCUMULATED $\delta_{PUSCH,c}$ [dB] | ABSOLUTE $\delta_{PUSCH,c}$ [dB] ONLY DCI FORMAT 0/0A/0B/4/4A/4B/6-0A |
|---|---|---|
| 0 | -1 | -4 |
| 1 | 0 | -1 |
| 2 | 1 | 1 |
| 3 | 3 | 4 |

FIG. 2

| TPC COMMAND FIELD IN DCI FORMAT 3A/3B | ACCUMULATED $\delta_{PUSCH,c}$ [dB] |
|---|---|
| 0 | -1 |
| 1 | 1 |

FIG. 9

| TPC COMMAND FIELD IN DCI FORMAT | ACCUMULATED $\delta_{PUSCH,c}$ [dB] (NORMAL) | ACCUMULATED $\delta_{PUSCH,c}$ [dB] (AFTER BPL SWITCH) |
|---|---|---|
| 0 | -1 | -3 |
| 1 | 0 | 0 |
| 2 | 1 | 3 |
| 3 | 3 | 6 |

FIG. 10

| TPC COMMAND FIELD IN DCI FORMAT | ACCUMULATED $\delta_{PUSCH,c}$ [dB] (NORMAL) | ACCUMULATED $\delta_{PUSCH,c}$ [dB] (AFTER INTER-TRP BPL SWITCH) |
|---|---|---|
| 0 | -1 | -3 |
| 1 | 0 | 0 |
| 2 | 1 | 3 |
| 3 | 3 | 6 |

FIG. 11

| TPC COMMAND FIELD IN DCI FORMAT | ACCUMULATED $\delta_{PUSCH,c}$ [dB] (NORMAL) | ACCUMULATED $\delta_{PUSCH,c}$ [dB] (AFTER INTRA-TRP BPL SWITCH) | ACCUMULATED $\delta_{PUSCH,c}$ [dB] (AFTER INTER-TRP BPL SWITCH) |
|---|---|---|---|
| 0 | -1 | -2 | -3 |
| 1 | 0 | 0 | 0 |
| 2 | 1 | 2 | 3 |
| 3 | 3 | 4 | 6 |

FIG. 12

| TPC COMMAND FIELD IN DCI FORMAT | ACCUMULATED $\delta_{PUSCH,c}$ [dB] (NORMAL) | ACCUMULATED $\delta_{PUSCH,c}$ [dB] (AFTER BPL SWITCH (BEAM WIDTH: WIDE)) | ACCUMULATED $\delta_{PUSCH,c}$ [dB] (AFTER BPL SWITCH (BEAM WIDTH: NARROW)) |
|---|---|---|---|
| 0 | -1 | -2 | -3 |
| 1 | 0 | 0 | 0 |
| 2 | 1 | 2 | 3 |
| 3 | 3 | 4 | 6 |

FIG. 15

| TPC COMMAND FIELD IN DCI FORMAT | ACCUMULATED $\delta_{PUSCH,c}$ [dB] | ACCUMULATED $\delta_{SRS,c}$ [dB] |
|---|---|---|
| 0 | -1 | -3 |
| 1 | 0 | 0 |
| 2 | 1 | 3 |
| 3 | 3 | 6 |

TERMINAL, BASE STATION, TRANSMISSION METHOD, AND RECEPTION METHOD

TECHNICAL FIELD

The present disclosure relates to a terminal a base station, a transmission method, and a reception method.

BACKGROUND ART

In the standardization of 5G, a new radio access technology (New Radio (NR)) that is not necessarily backwards-compatible with LTE/LTE-Advanced is being discussed by the 3GPP.

Because NR is also operated in high-frequency bands, the application of beamforming control to reduce path loss is under consideration. For this reason, in the discussion of the transmission power control (TPC) method for NR uplink, a function extension accounting for beamforming based on the LTE uplink transmission power control method (see NPL 1, for example) is under consideration (see NPL 2, for example).

CITATION LIST

Non Patent Literature

NPL 1: 3GPP TS 36.213 V14.3.0, "Physical layer procedures (Release 14)" (2017 June)
NPL 2: R1-1716114, "Power control framework for PUSCH", NTT DOCOMO, September 2017
NPL 3: R1-1712962, "Considerations on Multiple TRP/Panel Transmission", Sony, August 2017
NPL 4: R4-1707512, "CDF requirements for mmWave UEs", NTT DOCOMO, August 2017

SUMMARY OF INVENTION

Technical Problem

However, methods of transmission power control accounting for beamforming in NR have not been considered fully.

An embodiment of the present disclosure facilitates providing a terminal and a communication method capable of performing transmission power control appropriately while accounting for beamforming.

Solution to Problem

A terminal according to one embodiment of the present disclosure is provided with a circuit that calculates a transmission power of an uplink signal by using transmission power control information indicating one value from among a plurality of candidate values respectively associated with correction values that correct a control value to use in a closed loop control of the transmission power, and a transmitter that transmits the uplink signal with the transmission power, in which a first correction value and a second correction value having a larger step size than the first correction value are associated with each of the plurality of candidate values.

A terminal according to one embodiment of the present disclosure is provided with a circuit that generates transmission power control information indicating one value from among a plurality of candidate values respectively associated with correction values that correct a control value to use in a closed loop control of a transmission power of an uplink signal, and a receiver that receives the uplink signal transmitted with the transmission power, in which a first correction value and a second correction value having a larger step size than the first correction value are associated with each of the plurality of candidate values.

A transmission method according to one embodiment of the present disclosure includes calculating a transmission power of an uplink signal by using transmission power control information indicating one value from among a plurality of candidate values respectively associated with correction values that correct a control value to use in a closed loop control of the transmission power, and transmitting the uplink signal with the transmission power, in which a first correction value and a second correction value having a larger step size than the first correction value are associated with each of the plurality of candidate values.

A reception method according to one embodiment of the present disclosure includes generating transmission power control information indicating one value from among a plurality of candidate values respectively associated with correction values that correct a control value to use in a closed loop control of a transmission power of an uplink signal, and receiving the uplink signal transmitted with the transmission power, in which a first correction value and a second correction value having a larger step size than the first correction value are associated with each of the plurality of candidate values.

It should be noted that general or specific embodiments may be implemented as a system, an apparatus, a method, an integrated circuit, a computer program, a storage medium, or any selective combination thereof.

Advantageous Effects of Invention

According to an embodiment of the present disclosure, it is possible to perform transmission power control appropriately while accounting for beamforming.

Additional benefits and advantages according to an embodiment of the present disclosure will become apparent from the specification and the drawings. The benefits and/or advantages may be individually obtained by the various embodiments and features of the specification and drawings, which need not all be provided in order to obtain one or more of such benefits and/or advantages.

BRIEF DESCRIPTION OF DRAWINGS

FIG. 1 illustrates one example of a TPC command table (DCI format 0/0A/0B/3/4/4A/4B/6-0A/3B).
FIG. 2 illustrates one example of a TPC command table (DCI format 3A/3B).
FIG. 9 illustrates one example of the TPC command table according to Switching Method 1 of Embodiment 1.

FIG. 10 illustrates one example of the TPC command table according to Switching Method 2 of Embodiment 1.

FIG. 11 illustrates one example of the TPC command table according to Switching Method 3 of Embodiment 1.

FIG. 12 illustrates one example of the TPC command table according to Switching Method 4 of Embodiment 1.

FIG. 15 illustrates one example of the TPC command table according to Embodiment 2.

DESCRIPTION OF EMBODIMENTS

Figure 3:
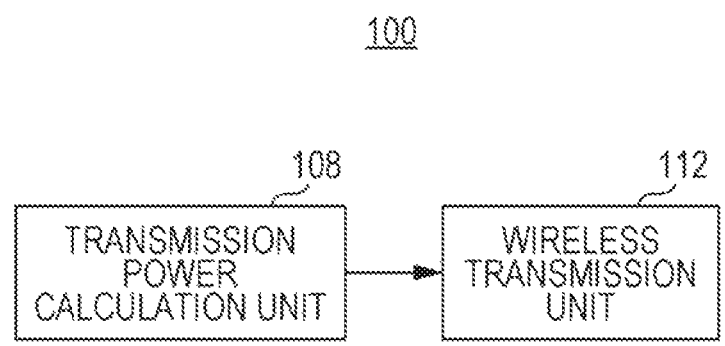
FIG. 3 illustrates a configuration of part of a terminal according to Embodiment 1.

Hereinafter, exemplary embodiments of the present disclosure will be described in detail and with reference to the drawings.

In LTE, a terminal (also called User Equipment (UE)) performs transmission power control on the uplink channel of each component carrier (CC). Formula (1) expresses a definitional equation of the transmission power of the physical uplink shared channel (PUSCH) used in LTE (see NPL 1, for example).

[Math. 1]

$$P_{PUSCH,c}(i) = \min\begin{Bmatrix} P_{CMAX,c}(i), \\ 10\log_{10}(M_{PUSCH,c}(i)) + P_{0\_PUSCH,c} + \alpha_c \cdot PL_c + \Delta_{TF,c}(i) + f_c(i) \end{Bmatrix}$$ [dBm] (1)

In Formula (1), $P_{PUSCH,c}(i)$ represents the transmission power of the PUSCH, $P_{CMAX,c}(i)$ represents the maximum transmission power [dBm] of the terminal, $M_{PUSCH,c}(i)$ represents the transmission bandwidth [PRB] of the PUSCH, $P_{0\_PUSCH,c}$ represents a target received power value [dBm] preset from the base station (also called the "eNB" or "gNB"), ac represents a weighting factor (preset value) that indicates a ratio of path loss compensation, $\Delta_{TF,c}(i)$ represents an offset [dB] dependent on the modulation and coding scheme (MCS) of the data to transmit, and $f_c(i)$ represents a closed loop correction value. Also, i represents a slot number (or a subframe number, or a mini-slot number), while c represents a cell number.

Herein, the method of computing the closed loop correction value $f_c(i)$ is different depending on the TPC mode. An "Accumulated mode" and an "Absolute mode" are included among the possible TPC modes, and for each terminal, the mode to apply quasi-statically is set by RRC signaling.

As indicated in Formula (2), the Accumulated mode computes $f_c(i)$ by accumulating a correction value $\delta_{PUSCH,c}$ [dB] (hereinafter called the "TPC command correction value"; also simply referred to as "$\delta_{PUSCH}$") indicated by past TPC commands (hereinafter called TPC command information). Note that in Formula (2), $K_{PUSCH}$ represents the timing at which the TPC command correction value is reflected.

[Math. 2]

$$f_c(i) = f_c(i-1) + \delta_{PUSCH,c}(i-K_{PUSCH})$$ (2)

As indicated in Formula (3), the Absolute mode computes $f_c(i)$ by using the TPC command correction value directly, without accumulating past TPC command correction values.

[Math. 3]

$$f_c(i) = \delta_{PUSCH,c}(i-K_{PUSCH})$$ (3)

Herein, FIGS. 1 and 2 illustrate TPC command tables indicating associations between the TPC command information and the TPC command correction value $\delta_{PUSCH}$. As illustrated in FIGS. 1 and 2, the TPC command table from which to reference the TPC command correction value $\delta_{PUSCH}$ reported from the base station to the terminal according to the TPC command information changes depending on the downlink control information (DCI) format (see NPL 1, for example).

Also, the PUSCH and the sounding reference signal (SRS) share the same closed loop correction value $f_c(i)$. On the other hand, the physical uplink control channel (PUCCH) uses a closed loop correction value different from the PUSCH and the SRS.

In NR, a pair of a transmission beam and a reception beam when applying beamforming is called a "beam pair link (BPL)" (see NPL 3, for example). In other words, the case in which either the transmission beam or the reception beam is changed results in a different BPL number. Also, to simplify control, it is conceivable for beamforming control to be performed in units called "BPL groups" for grouping multiple BPLs.

As one example of the BPL selection method, it is conceivable for the base station to select an optimal BPL on the basis of the SRS transmitted from the terminal, and indicate the BPL number of the selected BPL to the terminal. Also, as a specific method of beam selection, a method is conceivable in which the terminal transmits the SRS to the base station in consecutive symbols or slots while changing the BPL (also referred to as "beam sweeping"), and the base station selects optimal beams (BPL) on the basis of the reception quality of the received SRS.

Also, as a method of reporting the selected BPL from the base station to the terminal, it is conceivable for the base station to notify the terminal of control information enabling the terminal to identify the BPL, such as the SRS resource indicator (SRI), the CSI-RS resource indicator (CRI), or a beam indicator.

In addition, NR anticipates dynamically switching the BPL with respect to the terminal. There is also a possibility that the base station will perform BPL switching across multiple transmission and reception points (TRPs) connected by optical fiber or the like. For example, in the case in which there are two TRPs, beamforming control is performed such that, at a timing n, a BPL for transmitting and receiving data from TRP #0 is formed, and at a timing n+1, a BPL for transmitting and receiving data from TRP #1 is formed. At this time, in the case where the base station explicitly informs the terminal of transmission TRP information (for example, a TRP index) indicating the TRP used for transmission, the terminal can recognize which TRP a signal is being received from.

Note that in NR, the preparation of two types of SRS, namely an SRS to use for beam sweeping and an SRS to use for estimating channel state information (CSI), is under consideration.

At this point, immediately after the BPL is switched for beamforming control, there is a possibility that the estimated path loss error, including the beam gain between the BPLs, or the interference level between the BPLs will be largely different compared to the BPL before the switch. For this reason, a problem occurs in which, immediately after a BPL switch, the transmission power control does not function correctly, and the transmission signal does not reach a targeted signal-to-interference-and-noise ratio (SINR) or the interference on other cell(s) increases.

Also, because the interference level of each beam fluctuates dynamically, simply setting quasi-static open loop control parameters (such as $\alpha_c$ and $P_{0\_PUSCH,c}$) for each BPL is inadequate as a correction of the quality error immediately after a BPL switch. Therefore, it is necessary to correct the quality error immediately after a BPL switch by closed loop control with the TPC command information (TPC command correction value) reported from the base station.

However, each beam gain is expected to have a difference of up to a maximum of 20 dB (see NPL 4, for example). Therefore, if the TPC command correction value has a step size (granularity) similar to LTE, the convergence time for correcting the quality error immediately after a BPL switch becomes longer, and there is a possibility of degraded system performance because of a drop in desired signal power or an increase in interfering power in the period until the transmission power control value converges on an optimal value.

Also, a method of increasing the number of bits in the TPC command information to add step sizes of reportable TPC command correction values is conceivable, but with this method, a problem of increased DCI signaling overhead occurs.

Accordingly, one embodiment of the present disclosure describes a method of correcting the quality error immediately after a BPL switch in a short time without increasing the DCI signaling overhead, and performing appropriate transmission power control that accounts for beamforming.

Embodiment 1

Overview of Communication System

A communication system according to one embodiment of the present disclosure is provided with a terminal 100 and a base station 200.

FIG. 3 is a block diagram illustrating part of the configuration of the terminal 100 according to an embodiment of the present disclosure. In the terminal 100 illustrated in FIG. 3, a transmission power calculation unit 108 calculates the transmission power using transmission power control information (TPC command information) indicating one from among a plurality of candidate values respectively associated with a correction value (TPC command correction value) that corrects a control value (closed loop correction value) used in closed loop control of the transmission power of the uplink signal. A wireless transmission unit 112 transmits the uplink signal with the above transmission power.

Figure 4:
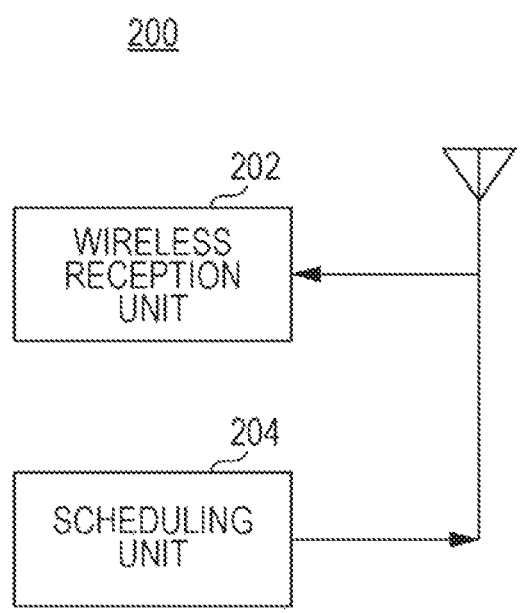
FIG. 4 illustrates a configuration of part of a base station according to Embodiment 1.

FIG. 4 is a block diagram illustrating part of the configuration of the base station 200 according to an embodiment of the present disclosure. In the base station 200 illustrated in FIG. 4, a scheduling unit 204 generates transmission power control information (TPC command information) indicating one from among a plurality of candidate values respectively associated with a correction value (TPC command correction value) that corrects the control value (closed loop correction value) used in closed loop control of the transmission power of the uplink signal. A wireless reception unit 202 receives the uplink signal transmitted with the above transmission power.

Herein, a first correction value and a second correction value having a larger step size than the first correction value are associated with each of the plurality of candidate values of the TPC command information.

Configuration of Terminal

Figure 5:
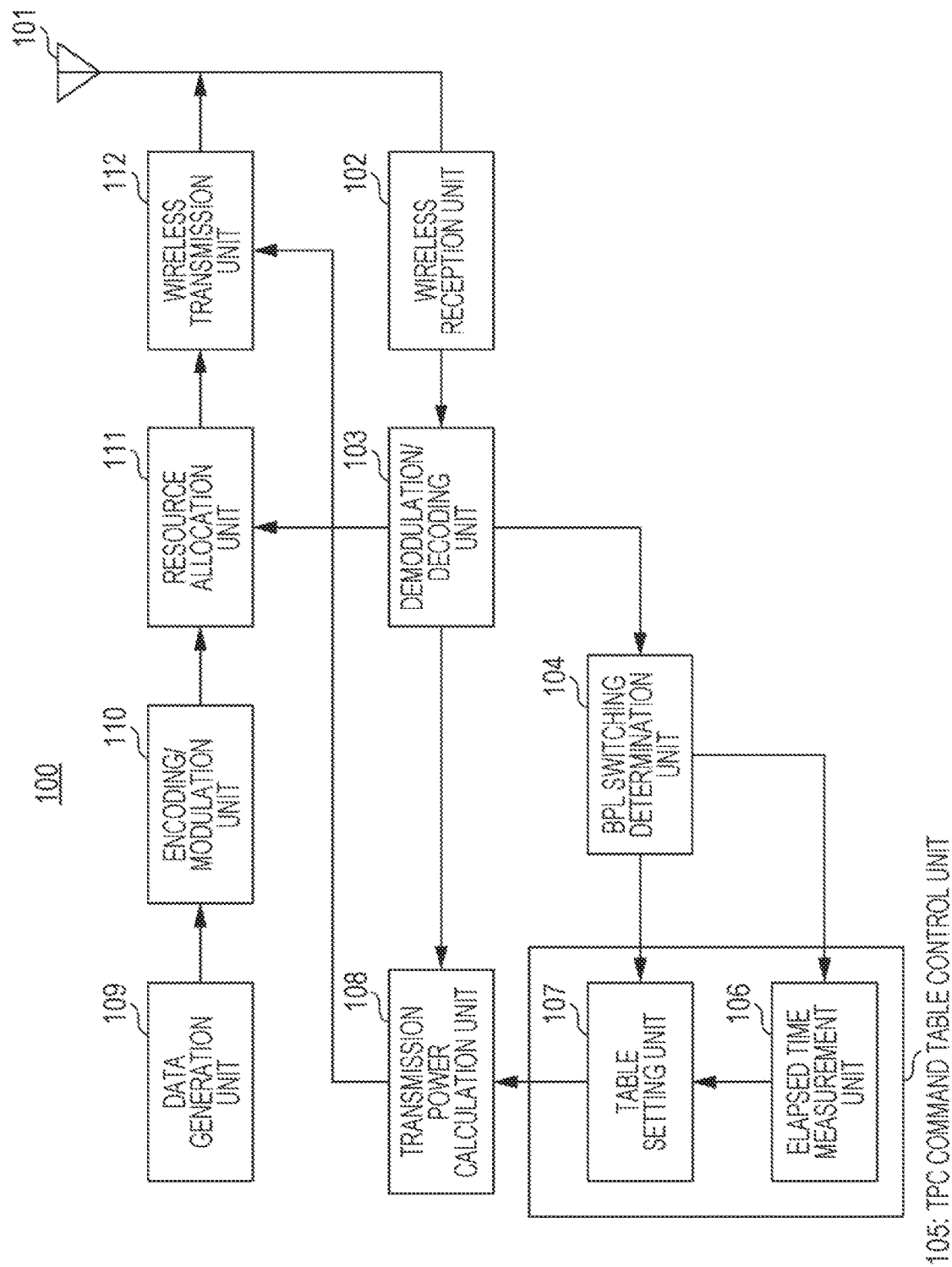
FIG. 5 illustrates a configuration of the terminal according to Embodiment 1.

FIG. 5 is a block diagram illustrating a configuration of the terminal 100 according to the present embodiment. The terminal 100 transmits an uplink channel signal to the base station 200 on the basis of an instruction from the base station 200.

In FIG. 5, the terminal 100 includes an antenna 101, a wireless reception unit 102, a demodulation/decoding unit 103, a BPL switching determination unit 104, a TPC command table control unit 105, a transmission power calculation unit 108, a data generation unit 109, an encoding/modulation unit 110, a resource allocation unit 111, and a wireless transmission unit 112.

The wireless reception unit 102 performs reception processing such as downconversion and A/D conversion on a reception signal received through the antenna 101, and outputs the reception signal to the demodulation/decoding unit 103.

The demodulation/decoding unit 103 demodulates and decodes the reception signal input from the wireless reception unit 102, and from the decoding result, extracts control information transmitted from the base station 200 and addressed to the terminal 100 (such as uplink channel resource information, transmission power information, and beam control information, for example). The demodulation/decoding unit 103 outputs the extracted information to the BPL switching determination unit 104, the transmission power calculation unit 108, and the resource allocation unit 111.

Uplink channel resource information includes, for example, frequency resource information indicating frequency resources with which the terminal 100 is to transmit the uplink channel (for example, the transmission bandwidth, the transmission band position (such as a PRB number or a block number), and temporal resource information indicating temporal resources (such as a slot number and an orthogonal frequency-division multiplexing (OFDM) symbol number with which to transmit the uplink channel, for example).

Additionally, the transmission power information includes information such as parameters used to calculate the transmission power of the uplink channel, such as TPC command information.

Also, beam control information includes information making it possible to recognize a beam set in the terminal 100, such as the SRI, the CRI, or the beam indicator, and the TRP index or the like.

Note that it is not necessary to report all of the uplink channel resource information, the transmission power information, or the beam control information to the terminal 100 at the same time. For example, partial information from the transmission power information may also be reported to the terminal 100 as common cell information or as quasi-static notification information. Also, partial information from the transmission power information may be stipulated by specifications as common system information, and does not have to be reported from the base station 200 to the terminal 100.

The BPL switching determination unit 104 uses the beam control information included in the control information input from the demodulation/decoding unit 103 (such as at least one of the SRI, CRI, and beam indicator, or the TRP index, for example) to determine whether or not a BPL switch has occurred. Note that the beam control information is not limited to the SRI, the CRI, the beam indicator, and the TRP index, and is sufficiently a parameter making it possible to determine the presence or absence of a BPL switch.

The method of determining a BPL switch in the BPL switching determination unit 104 may include, for example, storing the beam control information previously indicated by the base station 200, comparing beam control information newly reported by the base station 200 to the stored beam control information, and determining that a BPL switch has occurred in the case where the two pieces of beam control information indicate different values. Note that the method of determining whether or not a BPL switch has occurred is not limited to a method that uses the beam control information (SRI, CRI, beam indicator), and may also be a method that uses other information such as the transmission power parameter set (power control parameter set).

The BPL switching determination unit 104 outputs information indicating the presence or absence of a BPL switch to the TPC command table control unit 105.

The BPL switching determination unit 104 may also use the beam control information (for example, the TRP index) to determine whether or not the beam switch is occurring in the same TRP or in the same BPL group. The BPL switching determination unit 104 may determine whether or not the beam switch is in the same TRP (in the same BPL group) according to a difference in the TRP index indicated by the base station 200, for example. The BPL switching determination unit 104 outputs information indicating whether or not the BPL switch is in the same TRP or BPL group to the TPC command table control unit 105.

The TPC command table control unit 105 controls the TPC command table used by the terminal 100 in the closed loop control of the transmission power of the uplink signal (for example, the PUSCH). As the TPC command table indicating the association between the TPC command information and the TPC command correction value $\delta_{PUSCH}$, the TPC command table control unit 105 stores a TPC command table to use immediately after a BPL switch (called the "post-BPL switch TPC command table"), and a TPC command table to use at times other than immediately after a BPL switch (called the "normal TPC command table"). In other words, in the TPC command table, each of the plurality of candidate values of the TPC command information is associated with two correction values: a TPC command correction value to use normally, and a TPC command correction value to use immediately after a BPL switch. Note that the step size of the TPC command correction values to use immediately after a BPL switch is larger than the step size of the TPC command correction values to use normally.

The TPC command table control unit 105 includes an elapsed time measurement unit 106 and a table setting unit 107.

On the basis of information input from the BPL switching determination unit 104 (information related to the presence or absence of a BPL switch), the elapsed time measurement unit 106 counts the number of elapsed slots (or the elapsed time) since the timing when the BPL switch occurred, and determines whether or not the number of elapsed slots exceeds a threshold value X. The elapsed time measurement unit 106 outputs a determination result indicating whether or not the elapsed time since the BPL switch exceeds the threshold value X to the table setting unit 107. Note that details about the method of setting the threshold value X will be described later. Also, the measurement of elapsed time is not limited to the number of slots, and may also use the number of times the PUSCH is transmitted.

The table setting unit 107 switches between the normal TPC command table and the post-BPL switch TPC command table on the basis of the determination result input from the elapsed time measurement unit 106, and outputs the TPC command table to use in transmission power control to the transmission power calculation unit 108. Specifically, the table setting unit 107 outputs the post-BPL switch TPC command table to the transmission power calculation unit 108 in the case where the elapsed time since the BPL switch is within the period of the threshold value X, and outputs the normal TPC command table to the transmission power calculation unit 108 in the case where the elapsed time since the BPL switch exceeds the period of the threshold value X. Additionally, the table setting unit 107 may also switch the TPC command table on the basis of information input from the BPL switching determination unit 104 (information indicating whether or not the BPL switch is in the same TRP (BPL group)). Note that details about the method of switching the TPC command table in the table setting unit 107 will be described later.

The transmission power calculation unit 108 calculates the transmission power of the uplink channel (for example, the PUSCH) on the basis of the uplink channel resource information and the transmission power information input from the demodulation/decoding unit 103. For example, the transmission power calculation unit 108 calculates the transmission power in accordance with the transmission power formula expressed in Formula (1). At this point, terms such as $P_{O\_PUSCH,c}$ and $\alpha_c$ used in Formula (1) are included in the transmission power information reported from the base station 200, the path loss (PL) is estimated (not illustrated) in the terminal 100, and the closed loop correction value $f_c$ is computed from the TPC command correction value $\delta_{PUSCH}$ corresponding to the TPC command information included in the transmission power information and obtained by referencing the TPC command table input from the table setting unit 107 (see Formula (2), for example). The transmission power calculation unit 108 outputs information indicating the calculated transmission power of the uplink channel to the wireless transmission unit 112.

The data generation unit 109 generates data to be transmitted by the terminal 100. The data generation unit 109 outputs the generated transmission data to the encoding/modulation unit 110.

The encoding/modulation unit 110 encodes and modulates the transmission data input from the data generation unit 109, and outputs a modulated data signal to the resource allocation unit 111.

The resource allocation unit 111 allocates frequency resources and time resources to the modulated data signal input from the encoding/modulation unit 110, on the basis of the uplink channel resource information input from the demodulation/decoding unit 103. The resource allocation unit 111 outputs a resource-allocated signal sequence to the wireless transmission unit 112.

The wireless transmission unit 112 performs D/A conversion and upconversion on the signal input from the resource allocation unit 111, and transmits the obtained wireless signal from the antenna 101 to the base station 200 with the transmission power input from the transmission power calculation unit 108.

Configuration of Base Station

Figure 6:
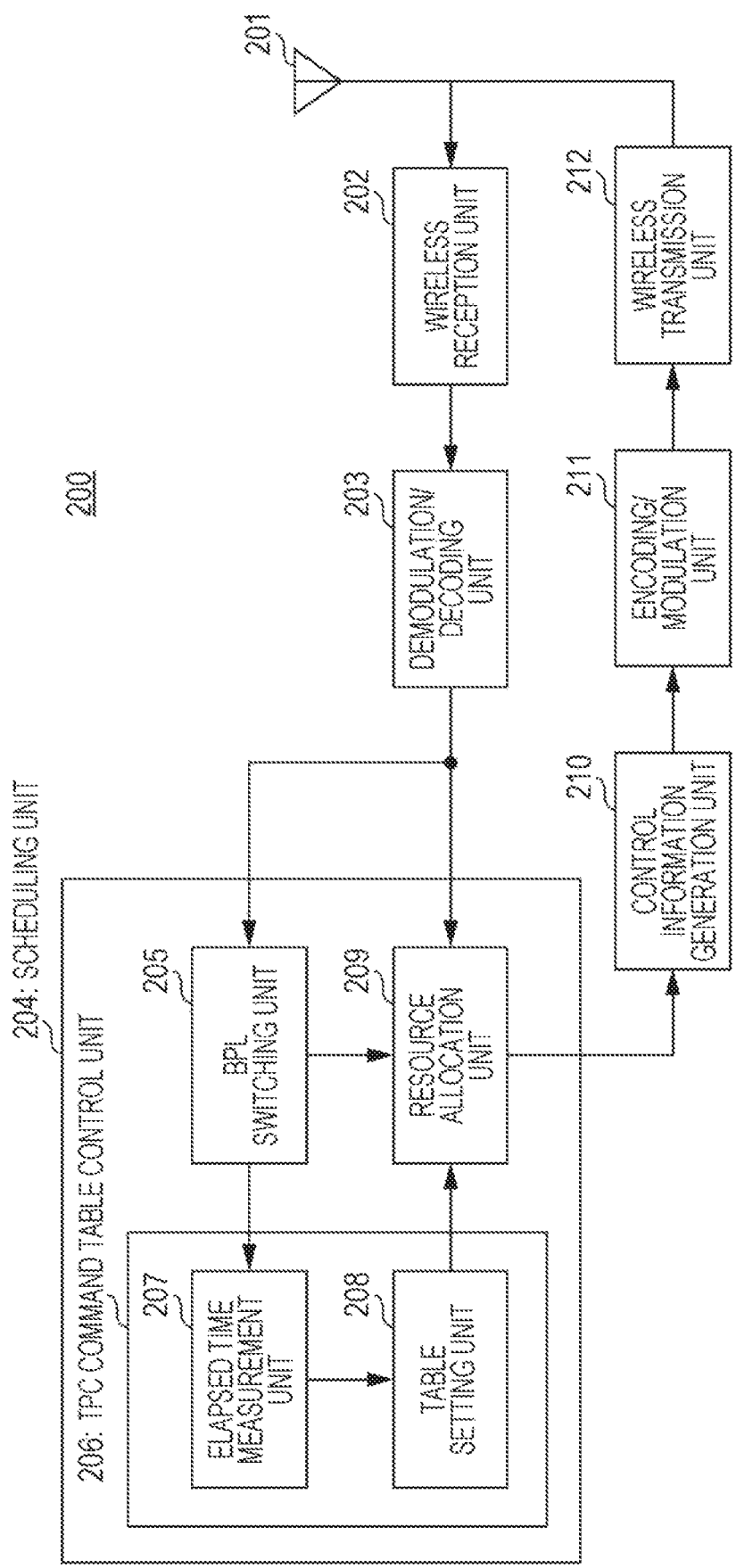
FIG. 6 illustrates a configuration of the base station according to Embodiment 1.

FIG. 6 is a block diagram illustrating a configuration of the base station 200 according to the present embodiment.

The base station 200 performs scheduling (including transmission power control) of the uplink channel signal for the terminal 100.

In FIG. 6, the base station 200 includes an antenna 201, a wireless reception unit 202, a demodulation/decoding unit 203, a scheduling unit 204, a control information generation unit 210, an encoding/modulation unit 211, and a wireless transmission unit 212.

The wireless reception unit 202 performs reception processing such as downconversion and A/D conversion on a signal received from the terminal 100 through the antenna 201, and outputs the reception signal to the demodulation/decoding unit 203.

The demodulation/decoding unit 203 demodulates and decodes the reception signal input from the wireless reception unit 202, and outputs quality information estimated from the signal included in the decoded reception data to the scheduling unit 204.

The scheduling unit 204 performs scheduling of the uplink channel (such as radio resource allocation or transmission power control) for terminals (including the terminal 100) accommodated by the base station 200, on the basis of the quality information input from the demodulation/decoding unit 203. The scheduling unit 204 includes a BPL switching unit 205, a TPC command table control unit 206, and a resource allocation unit 209.

The BPL switching unit 205 determines whether or not a beam switch (BPL switch) is necessary, on the basis of the quality information about each terminal input from the demodulation/decoding unit 203. For example, the BPL switching unit 205 determines that a BPL switch is necessary in the case where the quality information is poor, and unnecessary in the case where the quality information is good. The BPL switching unit 205 outputs BPL switch information indicating whether or not a BPL switch is necessary to the TPC command table control unit 206 and the resource allocation unit 209.

The TPC command table control unit 206 controls the TPC command table used in the terminal 100. The TPC command table stored by the TPC command table control unit 206 is the same as the table stored by the terminal 100 (TPC command table control unit 105). The TPC command table may be reported from the base station 200 to the terminal 100 or stipulated by specifications, and is uniquely associated between the terminal 100 and the base station 200.

The TPC command table control unit 206 includes an elapsed time measurement unit 207 and a table setting unit 208.

The elapsed time measurement unit 207, working similarly to the terminal 100 (elapsed time measurement unit 106), counts the number of elapsed slots (or the elapsed time) since the timing when the BPL switch occurred on the basis of BPL switch information input from the BPL switching unit 205, and determines whether or not the number of elapsed slots exceeds a threshold value X. The elapsed time measurement unit 207 outputs a determination result indicating whether or not the elapsed time since the BPL switch exceeds the threshold value X to the table setting unit 208.

The table setting unit 208, working similarly to the terminal 100 (table setting unit 107), switches between the normal TPC command table and the post-BPL switch TPC command table on the basis of the determination result input from the elapsed time measurement unit 207, and outputs the TPC command table to use in transmission power control to the resource allocation unit 209. Specifically, the table setting unit 208 outputs the post-BPL switch TPC command table to the resource allocation unit 209 in the case where the elapsed time since the BPL switch is within the period of the threshold value X, and outputs the normal TPC command table to the resource allocation unit 209 in the case where the elapsed time since the BPL switch exceeds the period of the threshold value X. Additionally, the table setting unit 208 may also switch the TPC command table on the basis of whether or not the BPL switch is in the same TRP (BPL group). Note that details about the method of switching the TPC command table in the table setting unit 208 will be described later.

The resource allocation unit 209 performs scheduling of the transmission channel of the terminal 100 (such as radio resource allocation control or transmission power control) on the basis of quality information (uplink channel quality) input from the demodulation/decoding unit 203, For example, in the resource allocation unit 209, a target reception SINR to use when deciding the MCS and the like is calculated under the expectation that the terminal 100 will perform transmission power control based on the TPC command table input from the table setting unit 208. The resource allocation unit 209 outputs control information for controlling data transmission in the terminal 100, including the decided scheduling information, to the control information generation unit 210.

At this point, the scheduling information includes uplink channel TPC command information. The resource allocation unit 209 references the TPC command table input from the table setting unit 208, and decides (generates) TPC command information on the basis of a difference value between a target received power and an actual received power of the uplink channel. Specifically, the resource allocation unit 209 selects the TPC command correction value $\delta_{PUSCH}$ closest to the difference value between the target received power and the actual received power of the uplink channel from the TPC command table, and decides to use the corresponding TPC command information.

On the basis of an instruction from the scheduling unit 204, the control information generation unit 210 generates a control signal containing scheduling information (including TPC command information) to report to the terminal 100, and outputs the generated control signal to the encoding/modulation unit 211.

The encoding/modulation unit 211 encodes and modulates the control signal input from the control information generation unit 210, and outputs the modulated signal to the wireless transmission unit 212.

The wireless transmission unit 212 performs transmission processing such as D/A conversion, upconversion, and amplification on the signal input from the encoding/modulation unit 211, and transmits the wireless signal obtained by the transmission processing from the antenna 201 to the terminal 100.

Operations of Terminal 100 and Base Station 200

Operations in the terminal 100 and the base station 200 having the above configurations will be described in detail.

Figure 7:
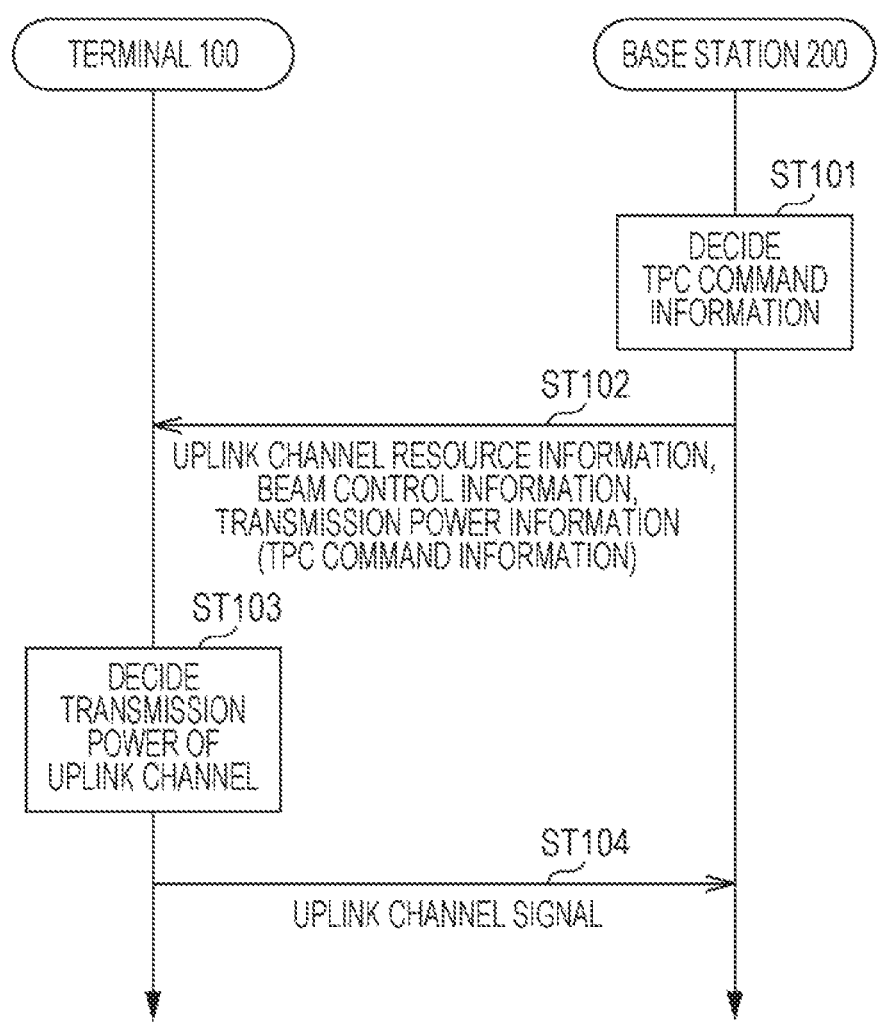
FIG. 7 illustrates exemplary operations of the terminal and the base station according to Embodiment 1.

FIG. 7 is a sequence diagram illustrating operations of the terminal 100 (FIG. 5) and the base station 200 (FIG. 6).

The base station 200 performs transmission power control with respect to the terminal 100, and decides the TPC command information to use for transmission power control in the terminal 100 (ST101). For example, the base station 200 switches the TPC command table according to the presence or absence of a BPL switch, and selects TPC command information (a candidate value) corresponding to the TPC command correction value $\delta_{PUSCH}$. Subsequently, the base station 200 transmits transmission power information including uplink channel resource information, beam control information, and the TPC command information decided in ST101 to the terminal 100 (ST102).

The terminal 100 uses the beam control information and the transmission power information (TPC command information) reported from the base station 200 in ST102 to decide the transmission power of the uplink channel (ST103). Subsequently, on the basis of the uplink channel resource information received in ST102 and the transmission power decided in ST103, the terminal 100 transmits an uplink channel signal to the base station 200 (ST104). In other words, the base station 200 receives an uplink channel signal transmitted from the terminal 100 with a transmission power based on the TPC command information decided in ST101.

TPC Command Table Switching Methods

Next, methods of switching the TPC command table stored by the TPC command table control unit 105 of the terminal 100 and the TPC command table control unit 206 of the base station 200 will be described in detail.

Hereinafter, TPC command table Switching Methods 1 to 4 will be respectively described.

Switching Method 1

Figure 8:
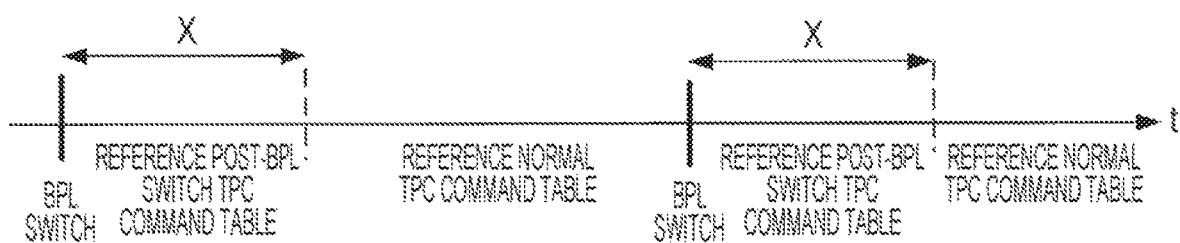
FIG. 8 illustrates one example of TPC command table switching according to Embodiment 1.

In Switching Method 1, as illustrated in FIG. 8, in the case where the elapsed time is within the threshold value X from the timing of a BPL switch, the terminal 100 and the base station 200 switch the TPC command table to reference in the transmission power control of the uplink channel signal (PUSCH) to the post-BPL switch TPC command table. On the other hand, as illustrated in FIG. 8, in the case where the elapsed time from the timing of a BPL switch exceeds the threshold value X, the terminal 100 and the base station 200 switch the TPC command table to reference in the transmission power control of the uplink channel signal to the normal TPC command table.

FIG. 9 illustrates one example of the TPC command table in Switching Method 1.

In FIG. 9, a TPC command correction value $\delta_{PUSCH}$ of the normal TPC command table and a TPC command correction value $\delta_{PUSCH}$ of the post-BPL switch TPC command table are each associated with every candidate value (0 to 3) of TPC command information (TPC command field in DCI format).

As illustrated in FIG. 9, the range of the TPC command correction value $\delta_{PUSCH}$ in the normal TPC command table is from −1 to 3 [dB] (in other words, the same as LTE (FIG. 1)). On the other hand, the range of the TPC command correction value $\delta_{PUSCH}$ in the post-BPL switch TPC command table is from −3 to 6 [dB]. In other words, the step size of the TPC command correction value $\delta_{PUSCH}$ in the post-BPL switch TPC command table is larger than the step size of the normal TPC command correction value $\delta_{PUSCH}$.

During a predetermined period (within the threshold value X) from a BPL switch, the terminal 100 and the base station 200 compute the transmission power by using a TPC command correction value $\delta_{PUSCH}$ with a large step size (that is, the post-BPL switch TPC command table) corresponding to a candidate value (a value from 0 to 3) indicated by the TPC command information. On the other hand, in periods outside the predetermined period from a BPL switch (in the case where the threshold value X is exceeded), the terminal 100 and the base station 200 compute the transmission power by using a TPC command correction value $\delta_{PUSCH}$ with a small step size (that is, the normal TPC command table) corresponding to a candidate value (a value from 0 to 3) indicated by the TPC command information.

By performing the above control, after a BPL switch, the terminal 100 can use a TPC command correction value $\delta_{PUSCH}$ with a large step size to quickly correct the quality difference between the BPLs before and after the switch.

Therefore, according to Switching Method 1, a drop in the desired signal power or an increase in interfering power after a BPL switch can be prevented, and the system performance can be improved. Also, according to Switching Method 1 (FIG. 9), compared to the LTE TPC command table (FIG. 1), the step size of the TPC command correction values can be increased without increasing the number of bits (herein, 2 bits) in the TPC command.

Note that FIG. 9 illustrates a case of newly setting a TPC command table that includes TPC command correction values with a large step size to use after a BPL switch, but the switching method is not limited to a method that newly provides a TPC command table to use after a BPL switch. For example, after a BPL switch (within the period of the threshold value X), the terminal 100 may also use the TPC command correction value $\delta_{PUSCH}$ of LTE Absolute mode (see FIG. 1, for example) as the TPC command correction value $\delta_{PUSCH}$ for Accumulated mode. As illustrated in FIG. 1, in LTE, the TPC command correction value $\delta_{PUSCH}$ of Absolute mode is set with a large step size than the TPC command correction value $\delta_{PUSCH}$ of Accumulated mode. For this reason, by having the terminal 100 use the TPC command correction value $\delta_{PUSCH}$ of Absolute mode after a BPL switch (within the period of the threshold value X) after a BPL switch (within the period of the threshold value X), an effect similar to the case of using the TPC command table illustrated in FIG. 9 is obtained.

Switching Method 2

In Switching Method 2, in the case where the elapsed time is within the threshold value X from the timing of a BPL switch, and the TRP where data is received from the base station 200 changes (hereinafter referred to as an "inter-TRP BPL switch"), the terminal 100 and the base station 200 switch the TPC command table to reference in the transmission power control of the uplink channel signal (PUSCH) to the post-BPL switch TPC command table.

On the other hand, in the case where the elapsed time from the timing of a BPL switch exceeds the threshold value X, and the BPL switch is performed in the same TRP (hereinafter referred to as an "intra-TRP BPL switch"), the terminal 100 and the base station 200 switch the TPC command table to reference in the transmission power control of the uplink channel signal to the normal TPC command table.

FIG. 10 illustrates one example of the TPC command table in Switching Method 2.

In FIG. 10, a TPC command correction value $\delta_{PUSCH}$ of the normal TPC command table and a TPC command correction value $\delta_{PUSCH}$ of the post-BPL switch TPC command table are each associated with every candidate value (0 to 3) of TPC command information (TPC command field in DCI format).

As illustrated in FIG. 10, the range of the TPC command correction value $\delta_{PUSCH}$ in the normal TPC command table is from −1 to 3 [dB] (in other words, the same as LTE (FIG. 1)), On the other hand, the range of the TPC command correction value $\delta_{PUSCH}$ in the post-BPL switch TPC command table is from −3 to 6 [dB]. In other words, the step size of the TPC command correction value $\delta_{PUSCH}$ in the post-BPL switch TPC command table is larger than the step size of the normal TPC command correction value $\delta_{PUSCH}$.

During a predetermined period (within the threshold value X) from a BPL switch between different TRPs, the terminal 100 and the base station 200 compute the transmission power by using a TPC command correction value $\delta_{PUSCH}$ with a large step size (that is, the post-BPL switch TPC command table) corresponding to a candidate value (a value from 0 to 3) indicated by the TPC command information. On the other hand, within the predetermined period from a BPL switch in the same TRP, or in a period outside the predetermined period, the terminal 100 and the base station 200 compute the transmission power by using a TPC command correction value $\delta_{PUSCH}$ with a small step size (that is, the normal TPC command table) corresponding to a candidate value (a value from 0 to 3) indicated by the TPC command information.

In a similar manner to Switching Method 1, by performing the above control, after an inter-TRP BPL switch, the terminal 100 can use a TPC command correction value $\delta_{PUSCH}$ with a large step size to quickly correct the quality difference between the BPLs before and after the switch. Therefore, according to Switching Method 2, a drop in the desired signal power or an increase in interfering power after a BPL switch can be prevented without increasing the number of bits in the TPC command information, and the system performance can be improved, in a similar manner to Switching Method 1.

Furthermore, according to Switching Method 2, in an intra-TRP BPL switch for which the beam gain difference between BPLs is thought to be smaller than for an inter-TRP BPL switch, the terminal 100 references a TPC command table with a small step size. With this arrangement, in cases where the beam gain difference between BPLs is small, an unnecessary increase in the convergence time of the transmission power control can be prevented.

Note that the cases in which the post-BPL switch TPC command table is referenced in Switching Method 2 are not limited to cases where an inter-TRP BPL switch occurs, and may also be cases where the BPL group changes during a BPL switch (hereinafter referred to as an "inter-BPL group BPL switch"). In this case, the terminal 100 and the base station 200 use the normal TPC command table with a small step size of the TPC command correction value $\delta_{PUSCH}$ when the BPL is switched but the BPL group does not change, and use the post-BPL switch TPC command table with a large step size of the TPC command correction value $\delta_{PUSCH}$ when the BPL and the BPL group both change. In cases where a BPL group switch occurs, the beam gain difference between BPLs is thought to be large, similarly to the case in which a TRP switch occurs, and therefore an effect similar to Switching Method 2 described above is obtained even for a BPL group switch.

Switching Method 3

In Switching Method 3, as illustrated in FIG. 8, in the case where the elapsed time is within the threshold value X from the timing of a BPL switch, the terminal 100 and the base station 200 switch the TPC command table to reference in the transmission power control of the uplink channel signal (PUSCH) to a TPC command table with a large step size of the TPC command correction value $\delta_{PUSCH}$, similarly to Switching Method 1. On the other hand, in the case where the elapsed time from the timing of a BPL switch exceeds the threshold value X, the terminal 100 and the base station 200 switch the TPC command table to reference in the transmission power control of the uplink channel signal (PUSCH) to the normal TPC command table with a small step size of the TPC command correction value $\delta_{PUSCH}$.

Furthermore, in Switching Method 3, a TPC command table to reference when an intra-TRP BPL switch occurs (hereinafter referred to as the "post-intra-TRP BPL switch TPC command table") and a TPC command table to reference when an inter-TRP BPL switch occurs (hereinafter referred to as the "post-inter-TRP BPL switch TPC command table") are provided.

FIG. 11 illustrates one example of the TPC command table in Switching Method 3.

In FIG. 11, a TPC command correction value $\delta_{PUSCH}$ of the normal TPC command table, a TPC command correction value $\delta_{PUSCH}$ of the post-intra-TRP BPL switch TPC command table, and a TPC command correction value $\delta_{PUSCH}$ of the post-inter-TRP BPL switch TPC command table are each associated with every candidate value (0 to 3) of TPC command information (TPC command field in DCI format).

As illustrated in FIG. 11, the range of the TPC command correction value $\delta_{PUSCH}$ in the normal TPC command table is from −1 to 3 [dB] (in other words, the same as LTE (FIG. 1)). Also, the range of the TPC command correction value $\delta_{PUSCH}$ in the post-intra-TRP BPL switch TPC command table is from −2 to 4 [dB], and the range of the TPC command correction value $\delta_{PUSCH}$ in the post-inter-TRP BPL switch TPC command table is from −3 to 6 [dB], In other words, the step sizes of the TPC command correction value $\delta_{PUSCH}$ in each of the post-intra-TRP/inter-TRP BPL switch TPC command tables are larger than the step size of the normal TPC command correction value $\delta_{PUSCH}$. Furthermore, the step size of the TPC command correction value $\delta_{PUSCH}$ in the post-inter-TRP BPL switch TPC command table is larger than the step size of the TPC command correction value $\delta_{PUSCH}$ in the post-intra-TRP BPL switch TPC command table.

In the case where a BPL switch has not occurred (in the case where the threshold value X is exceeded), the terminal 100 and the base station 200 compute the transmission power by using a TPC command correction value $\delta_{PUSCH}$ with a small step size (that is, the normal TPC command table) corresponding to a candidate value (a value from 0 to 3) indicated by the TPC command information. Also, during a predetermined period (within the threshold value X) from a BPL switch in the same TRP, the terminal 100 and the base station 200 compute the transmission power by using a TPC command correction value $\delta_{PUSCH}$ with a large step size (that is, the post-intra-TRP BPL switch TPC command table) corresponding to a candidate value (a value from 0 to 3) indicated by the TPC command information. Also, during a predetermined period (within the threshold value X) from a BPL switch between different TRPs, the terminal 100 and the base station 200 compute the transmission power by using a TPC command correction value $\delta_{PUSCH}$ with an even larger step size (that is, the post-inter-TRP BPL switch TPC command table) corresponding to a candidate value (a value from 0 to 3) indicated by the TPC command information.

In a similar manner to Switching Method 1, by performing the above control, after a BPL switch, the terminal 100 can use a TPC command correction value $\delta_{PUSCH}$ with a large step size to quickly correct the quality difference between the BPLs before and after the switch.

Furthermore, according to Switching Method 3, in an intra-TRP BPL switch for which the beam gain difference between BPLs is thought to be smaller than for an inter-TRP BPL switch, the terminal 100 references a TPC command table with a small step size of the TPC command correction value $\delta_{PUSCH}$. With this arrangement, in cases where the beam gain difference between BPLs is small, an unnecessary increase in the convergence time of the transmission power control can be prevented. In other words, according to Switching Method 3, by referencing different TPC command tables for an intra-TRP BPL switch and an inter-TRP BPL switch, the terminal 100 can appropriately adjust the transmission power on the basis of a step size of the TPC command correction value $\delta_{PUSCH}$ that corresponds to the magnitude of the quality different between BPLs when a BPL switch occurs.

Switching Method 4

In Switching Method 4, as illustrated in FIG. 8, in the case where the elapsed time is within the threshold value X from the timing of a BPL switch, the terminal 100 and the base station 200 switch the TPC command table to reference in the transmission power control of the uplink channel signal (PUSCH) to a TPC command table with a large step size of the TPC command correction value $\delta_{PUSCH}$, similarly to Switching Method 1. On the other hand, in the case where the elapsed time from the timing of a BPL switch exceeds the threshold value X, the terminal 100 and the base station 200 switch the TPC command table to reference in the transmission power control of the uplink channel signal (PUSCH) to the normal TPC command table with a small step size of the TPC command correction value $\delta_{PUSCH}$.

In Switching Method 4, the TPC command table to reference within a predetermined period (within the threshold value X) from a BPL switch is different depending on the beam width set in the terminal 100.

FIG. 12 illustrates one example of the TPC command table in Switching Method 4.

In FIG. 12, a TPC command correction value $\delta_{PUSCH}$ of the normal TPC command table, a TPC command correction value $\delta_{PUSCH}$ of a post-BPL switch TPC command table for the case of a wide beam width, and a TPC command correction value $\delta_{PUSCH}$ of a post-BPL switch TPC command table for the case of a narrow beam width are each associated with every candidate value (0 to 3) of TPC command information (TPC command field in DCI format).

As illustrated in FIG. 12, the range of the TPC command correction value $\delta_{PUSCH}$ in the normal TPC command table is from −1 to 3 [dB] (in other words, the same as LTE (FIG. 1)). Also, the range of the TPC command correction value $\delta_{PUSCH}$ in the post-BPL switch TPC command table for the case of a wide beam width (hereinafter referred to as the "wide beam width post-BPL switch TPC command table") is from −2 to 4 [dB], and the range of the TPC command correction value $\delta_{PUSCH}$ in the post-BPL switch TPC command table for the case of a narrow beam width (hereinafter referred to as the "narrow beam width post-BPL switch TPC command table") is from −3 to 6 [dB]. In other words, the step size of the TPC command correction value $\delta_{PUSCH}$ in each of the post-BPL switch TPC command tables is larger than the step size of the normal TPC command correction value $\delta_{PUSCH}$. Furthermore, the step size of the TPC command correction value $\delta_{PUSCH}$ in the narrow beam width post-BPL switch TPC command table is larger than the step size of the TPC command correction value $\delta_{PUSCH}$ in the wide beam width post-BPL switch TPC command table.

In the case where a BPL switch has not occurred (in the case where the threshold value X is exceeded), the terminal 100 and the base station 200 compute the transmission power by using a TPC command correction value $\delta_{PUSCH}$ with a small step size (that is, the normal TPC command table) corresponding to a candidate value (a value from 0 to 3) indicated by the TPC command information. Also, during a predetermined period (within the threshold value X) from a BPL switch, in the case where the beam width set in the terminal 100 is wide, the terminal 100 and the base station 200 compute the transmission power by using a TPC command correction value $\delta_{PUSCH}$ with a large step size (that is, the width beam width post-BPL switch TPC command table) corresponding to a candidate value (a value from 0 to 3) indicated by the TPC command information, whereas in the case where the beam width set in the terminal 100 is narrow, the terminal 100 and the base station 200 compute the transmission power by using a TPC command correction value $\delta_{PUSCH}$ with an even larger step size (that is, the narrow beam width post-BPL switch TPC command table) corresponding to a candidate value (a value from 0 to 3) indicated by the TPC command information.

In a similar manner to Switching Method 1, by performing the above control, after a BPL switch, the terminal 100 can use a TPC command correction value $\delta_{PUSCH}$ with a large step size to quickly correct the quality difference between the BPLs before and after the switch.

Also, in Switching Method 4, the amount of change in the beam gain before and after a beam switch in the case of a narrow beam width (the case in which there are many beams) is expected to be greater than the amount of change in the beam gain before and after a beam switch in the case of a wide beam width (the case in which there are few beams). Therefore, as illustrated in FIG. 12, immediately after a BPL switch, by referencing a TPC command table with a wider step size of the TPC command correction value $\delta_{PUSCH}$ for a narrower beam width, the terminal 100 can shorten the convergence time of the transmission power control.

In other words, in Switching Method 4, in a BPL switch in the case of a wide beam width for which the beam gain difference between BPLs is thought to be relatively small, the terminal 100 references the TPC command table with a relatively small step size of the TPC command correction value $\delta_{PUSCH}$, and thereby can prevent unnecessary increases in the convergence time of the transmission power control. In other words, according to Switching Method 4, by referencing different TPC command tables depending on the beam width, the terminal 100 can appropriately adjust the transmission power on the basis of a step size of the TPC command correction value $\delta_{PUSCH}$ that corresponds to the magnitude of the quality different between BPLs when a BPL switch occurs.

There is a possibility that the beam width or the number of beams set in the terminal 100 is stipulated by the capability information of the terminal (UE). For example, operating methods are anticipated in which a narrow beam width is set as the UE capability of a terminal 100 having many antennas and high processing performance, while a wide beam width is set as the UE capability of a terminal 100 having few antennas and low processing performance. In other words, in Switching Method 4, the terminal 100 and the base station 200 may also switch the TPC command table on the basis of the UE capability information for the terminal 100 rather than the beam width or the number of beams.

Additionally, the beam width or the number of beams set in the terminal 100 may also be changed on the basis of the class of reference signal to use for path loss estimation in the transmission power control. For example, synchronization signal (SS) block and CSI-RS are conceivable as reference signal classes. Because SS block is a signal transmitted before synchronization between the terminal and the base station is secured, the width of the beam used in the transmission of the SS block is conceivably greater than the width of the beam used in the transmission of the CSI-RS. Therefore, the beam width is wide for the PUSCH transmitted using transmission power control that has estimated the path loss with the SS block, and the beam width is narrow for the PUSCH transmitted using transmission power control that has estimated the path loss with the CSI-RS. In other words, in Switching Method 4, the terminal 100 and the base station 200 may also switch the TPC command table on the basis of the signal used for path loss estimation in the transmission power control rather than the beam width or the number of beams.

Additionally, the beam width or the number of beams set in the terminal 100 may also be changed depending on the carrier frequency. For example, for the millimeter-wave band in which the carrier frequency is 24 GHz or higher, there are conceivably more antennas and the managed beam widths are conceivably narrower compared to carrier frequencies lower than 24 GHz. In other words, in Switching Method 4, the terminal 100 and the base station 200 may also switch the TPC command table on the basis of the carrier frequency rather than the beam width or the number of beams.

The above describes TPC command table Switching Methods 1 to 4.

Note that in Switching Methods 1 to 4, the transmission power control of the PUSCH is described as an example, but the terminal 100 and the base station 200 may also perform processing similar to Switching Methods 1 to 4 with respect to another uplink channel such as the PUCCH in addition to (or instead of) the PUSCH. In this case, the terminal 100 and the base station 200 may determine for every channel whether a BPL switch has occurred, and perform the table switching control for each channel in which a BPL switch has occurred. Also, in the case of measuring the elapsed time from a BPL switch on the basis of the number of channel transmissions, the elapsed time measurement units 106 and 207 may implement a method of counting the number of transmissions for each channel in which a BPL switch occurs, or a method of counting the total number of transmissions for all uplink channels.

Also, Switching Methods 1 to 4 describe the Accumulated mode as one example, but the TPC command table to reference may also be switched according to the elapsed time from a BPL switch similarly in the Absolute mode.

Also, Switching Methods 1 to 4 may also implement a control method that switches the TPC command table at a timing after a BPL group switch rather than after a BPL switch.

Method of Setting Threshold Value X

Next, a method of setting the threshold value X illustrated in FIG. 8 will be described.

The threshold value X may be defined in a specification document or reported from the base station 200 to the terminal 100 by higher-layer signaling or the like.

The threshold value X may also be set according to the UE capability information (beam width or number of beams), the difference in BPL numbers before and after a BPL switch, or whether or not the BPL switch is in the same TRP or BPL group. Specifically, the threshold value X may be set to a larger value according to conditions whereby the beam gain difference increases during a BPL switch (for example, the beam width is narrow, there are many beams, the difference in beam number before and after a BPL switch is large, or beams are switched to a different TRP or BPL group).

With this arrangement, under conditions in which the beam gain difference during a BPL switch is large, time (period) for correcting the quality difference immediately after the BPL switch can be secured sufficiently, and the terminal 100 can correct the quality difference in a short time within the period of the threshold value X. Also, under conditions in which the beam gain difference during a BPL switch is small, it is possible to prevent the time (period) for correcting the quality difference immediately after the BPL switch from becoming unnecessarily long, and prevent an unnecessary increase in the convergence time of the transmission power control.

The above describes a method of setting the threshold value X.

In this way, in the present embodiment, in a predetermined time after a BPL switch, the terminal 100 and the base station 200 reference a TPC command table that is different (has a larger step size than) the normal TPC command table in the transmission power control. With this arrangement, even in cases where the beam gain difference is large after a BPL switch, by closed loop control using a TPC command correction value with a large step size, the terminal 100 can correct the quality error immediately after the BPL switch in a short time.

Also, in the present embodiment, because the TPC command correction value (that is, the step size) corresponding to the TPC command information is switched depending on whether or not a BPL switch has occurred, the number of bits in the TPC command information is not increased.

Therefore, according to the present embodiment, it is possible to correct the quality error immediately after a BPL switch in a short time without increasing the DCI signaling overhead, and perform appropriate transmission power control that accounts for beamforming.

Embodiment 2

The present embodiment focuses on a BPL switch sequence (for example, FIG. 13) to describe a method of changing the method of selecting the TPC command table to use in the transmission power control of the SRS. In other words, Embodiment 1 describes the uplink data channel (PUSCH) as the uplink signal to be controlled by the transmission power control, but in the present embodiment, the SRS is the uplink signal to be controlled by the transmission power control.

Figure 13:
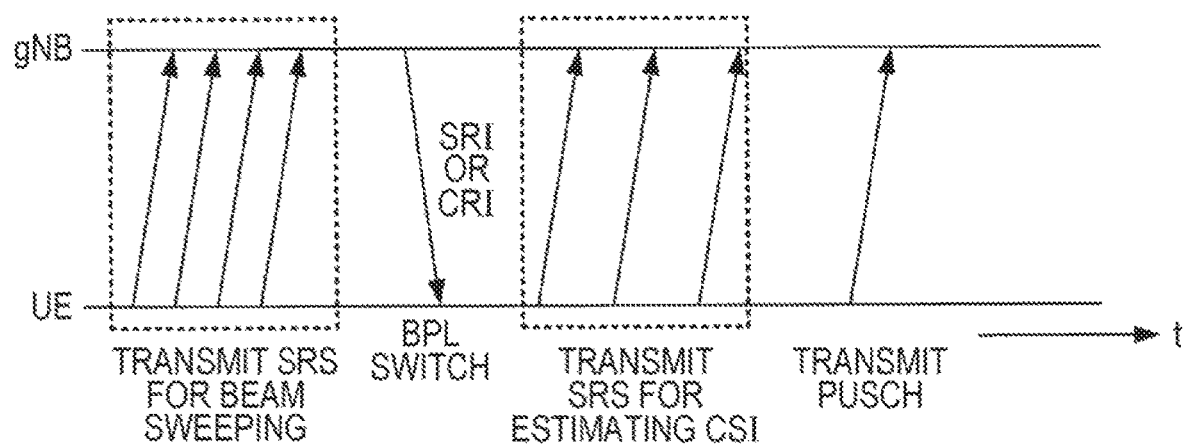
FIG. 13 illustrates one example of a BPL switching sequence according to Embodiment 2.

FIG. 13 illustrates one example of a BPL switch sequence. In the case where the terminal (UE) or the base station (gNB) determines that the received power of the signal has decreased, the BPL switch control illustrated in FIG. 13 is initiated.

As illustrated in FIG. 13, the terminal (UE) transmits an SRS for beam sweeping (also called beam management), while the base station (gNB) uses the beam sweeping SRS to measure the reception quality of each BPL and select an optimal BPL.

Subsequently, the base station notifies the terminal of control information (for example, the SRI or the CRI) containing information such as the BPL number of the selected BPL.

After that, the terminal uses the BPL indicated by the control information to transmit an SRS for CSI estimation multiple times. In other words, a BPL switch occurs at this point in time. The base station uses the SRS for CSI estimation to measure the uplink reception quality.

Subsequently, the base station performs scheduling on the basis of the estimated uplink reception quality, and uses a UL grant to instruct the terminal to transmit the PUSCH (not illustrated). The terminal transmits the PUSCH in accordance with the UL grant.

As illustrated in FIG. 13, the BPL switch is performed during the beam sweeping process and the CSI estimation process. Therefore, the interval in which the SRS for CSI estimation is transmitted before transmitting the PUSCH may be considered to be an interval immediately after a BPL switch. Accordingly, in the present embodiment, in at least the interval in which the SRS for CSI estimation is transmitted before transmitting the PUSCH, the terminal and the base station correct the closed loop correction value $f_c$ after a BPL switch similar to Embodiment 1. In other words, in the present embodiment, the transmission power control of the PUSCH may be a process similar to LTE.

Configuration of Terminal

Figure 14:
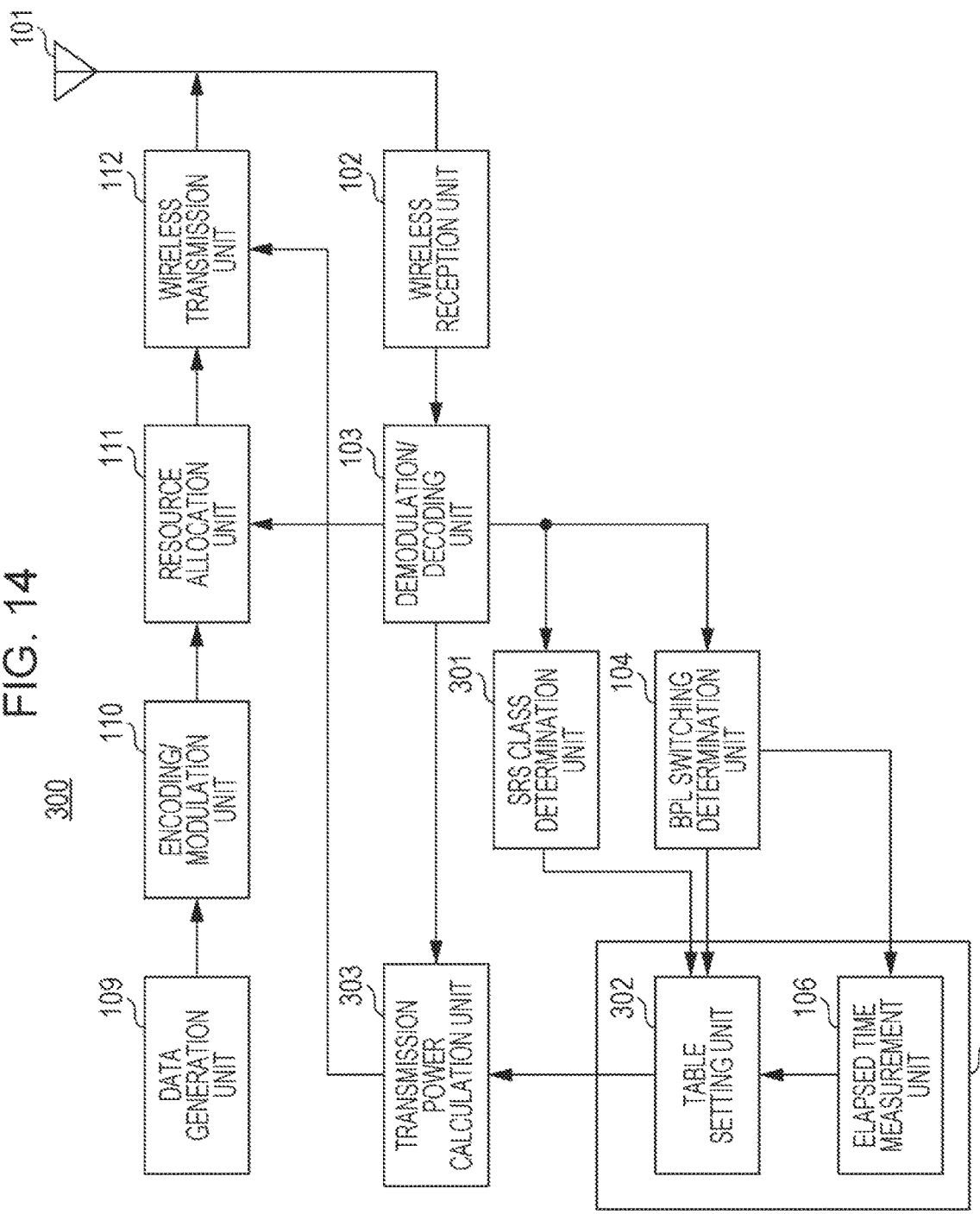
FIG. 14 illustrates a configuration of the terminal according to Embodiment 2.

FIG. 14 is a block diagram illustrating a configuration of a terminal 300 according to the present embodiment. Note that in FIG. 14, configuration elements similar to Embodiment 1 (FIG. 5) are denoted by the same signs, and description thereof will be omitted. Specifically, in FIG. 14, an SRS class determination unit 301 has been added, and the operations of a table setting unit 302 and a transmission power calculation unit 303 are different from Embodiment 1.

The SRS class determination unit 301 determines the SRS transmission class on the basis of information (described later) related to the SRS transmission method included in the control information input from the demodulation/decoding unit 103. The SRS transmission class expresses the purpose of the SRS (such as beam sweeping or CSI estimation), for example. The SRS class determination unit 301 outputs information indicating the determined SRS transmission class to the table setting unit 302.

Note that it is not necessary for the SRS transmission class to be reported using the downlink control information (DCI). Partial information about the SRS transmission class may also be reported to the terminal 300 as common cell information or as quasi-static notification information.

The table setting unit 302 stores a "PUSCH TPC command table" used in the transmission power control of the PUSCH and an "SRS TPC command table" used in the transmission power control of the SRS.

FIG. 15 illustrates one example of the TPC command table in the present embodiment.

As illustrated in FIG. 15, the range of the TPC command correction value $\delta_{PUSCH}$ in the PUSCH TPC command table is from −1 to 3 [dB] (in other words, the same as LTE (FIG. 1)). On the other hand, the range of the TPC command correction value $\delta_{SRS}$ in the SRS TPC command table is from −3 to 6 [dB].

In other words, the step size of the TPC command correction value $\delta_{SRS}$ in the SRS TPC command table is larger than the step size of the TPC command correction value $\delta_{PUSCH}$ in the PUSCH TPC command table.

During the transmission power control of the PUSCH, the table setting unit 302 outputs the PUSCH TPC command table with the small step size to the transmission power calculation unit 303, regardless of the presence or absence of a BPL switch. On the other hand, during the transmission power control of the SRS, if a determination result indicating that a BPL switch has just occurred is input from the elapsed time measurement unit 106 (in other words, in the case where the elapsed time from a BPL switch is within the threshold value X), the table setting unit 302 switches the TPC command table according to the SRS transmission class input from the SRS class determination unit 301. Details regarding the SRS transmission class used as the basis for switching the TPC command table in the table setting unit 302 will be described later.

Subsequently, the table setting unit 302 outputs the TPC command tables for the PUSCH and the SRS to the transmission power calculation unit 303.

Note that the TPC command table used by the table setting unit 302 may be the SRS TPC command table illustrated in FIG. 15, or may be combined with the TPC command tables described in Switching Methods 2 to 4 of Embodiment 1. In other words, the table setting unit 302 may also change the TPC command table switching method according to whether or not an inter-TRP BPL switch, an intra-TRP BPL switch, or an inter-BPL group BPL switch has occurred, or according to the UE capability.

Additionally, the table setting unit 302 may also switch the SRS TPC command table even in cases where a determination result not indicating that a BPL switch has just occurred is input from the elapsed time measurement unit 106.

When triggered by the transmission of the PUSCH or the SRS, the transmission power calculation unit 303 calculates the transmission power of the PUSCH or the SRS to transmit on the basis of the uplink channel resource information input from the demodulation/decoding unit 103.

For example, the transmission power calculation unit 303 may calculate the transmission power of the PUSCH on the basis of Formula (1), and may calculate the transmission power of the SRS by using a transmission power calculation formula based on the PUSCH transmission power calculation formula, such as by adding a fixed offset to Formula (1). Also, when computing the closed loop control correction value $f_c$, the transmission power calculation unit 303 selects the TPC command correction value $\delta_{PUSCH}$ or $\delta_{SRS}$ by using the TPC command information included in the transmission power control and the TPC command table (the PUSCH TPC command table or the SRS TPC command table) input from the table setting unit 302. The transmission power calculation unit 303 outputs the transmission power calculation result to the wireless transmission unit 112.

Note that in the present embodiment, a common closed loop correction value may be used to compute the transmission power of both the SRS and the PUSCH, similarly to LTE. Also, the transmission power calculation unit 303 may change the method of computing the closed loop correction value according to the downlink control information (DCI) format. Details regarding methods of computing the closed loop correction value in the transmission power calculation unit 303 will be described later.

Configuration of Base Station

Figure 16:
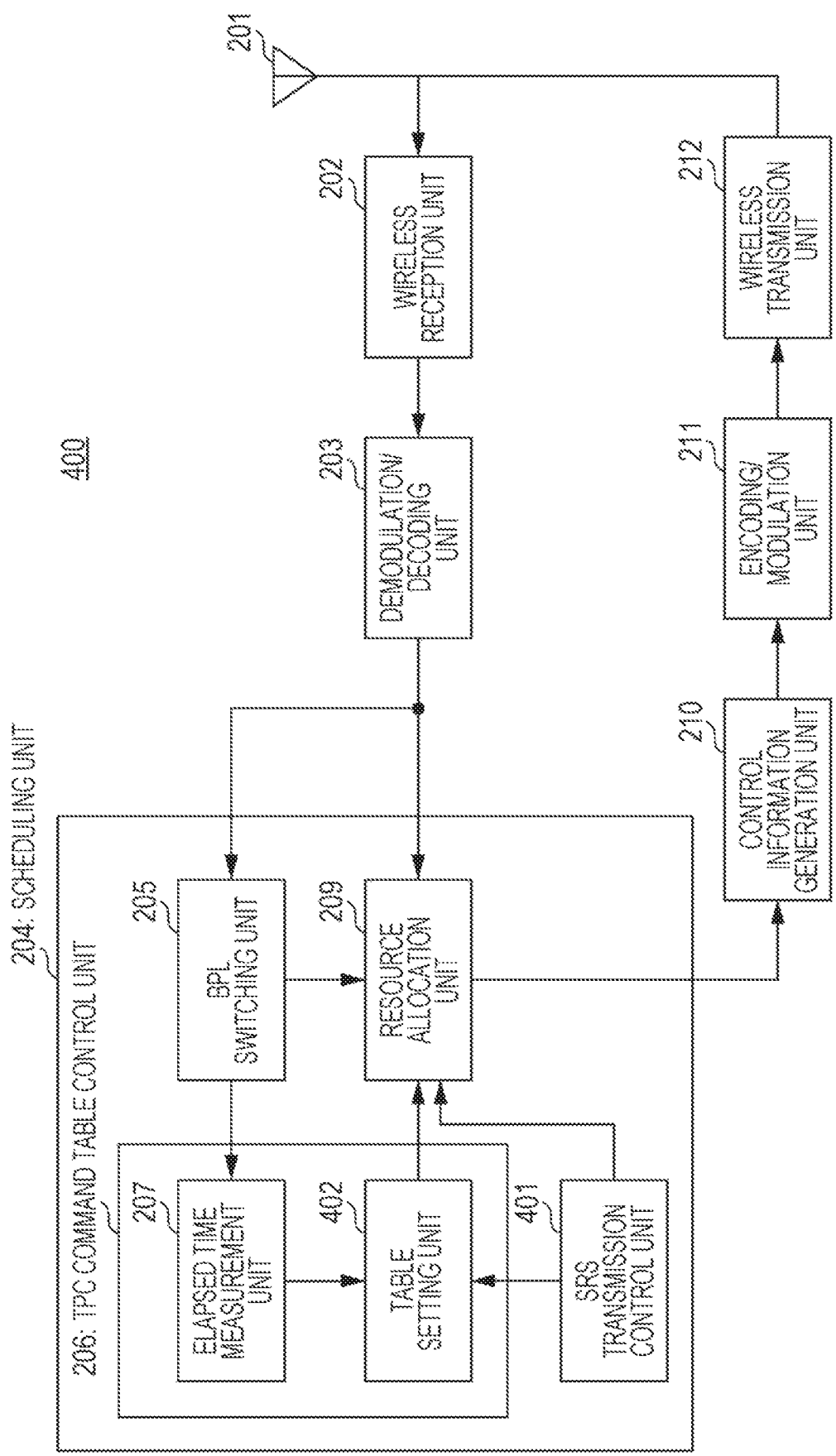
FIG. 16 illustrates a configuration of the base station according to Embodiment 2.

FIG. 16 is a block diagram illustrating a configuration of a base station 400 according to the present embodiment. Note that in FIG. 16, configuration elements similar to Embodiment 1 (FIG. 6) are denoted by the same signs, and description thereof will be omitted. Specifically, in FIG. 16, an SRS transmission control unit 401 has been added, and the operations of a table setting unit 402 are different from Embodiment 1.

The SRS transmission control unit 401 decides the class of the SRS (SRS transmission class, such as beam sweeping or CSI estimation, for example) to instruct the terminal 300 to transmit, and outputs information indicating the SRS transmission class to the table setting unit 402. Also, the information indicating the SRS transmission class is output to the resource allocation unit 209 and transmitted to the terminal 300 as control information for controlling the SRS transmission by the terminal 300 (information related to the SRS transmission method).

The table setting unit 402, working similarly to the table setting unit 302 of the terminal 300, switches the TPC command table to use during the transmission of the SRS according to the SRS transmission class input from the SRS transmission control unit 401. In other words, the TPC command table stored by the table setting unit 402 is the same as the table (see FIG. 15, for example) stored by the terminal 300 (table setting unit 302).

Next, the transmission power control in the terminal 300 and the base station 400 will be described in detail.

First, a method of setting the TPC command table according to the SRS transmission class in the table setting unit 302 and the table setting unit 402 will be described.

Hereinafter, TPC command table Setting Examples 1 and 2 depending on the SRS transmission class will be described.

SETTING EXAMPLE 1

In Setting Example 1, the table setting units 302 and 402 switch to the SRS TPC command table when transmitting the SRS and switch to the PUSCH TPC command table when transmitting the PUSCH, regardless of the SRS transmission class (CSI estimation or beam sweeping). The terminal 300 references the switched TPC command table and uses the TPC command correction value ($\delta_{PUSCH}$ or $\delta_{SRS}$) corresponding to the TPC command information reported by the base station 400 to update the closed loop correction value for the SRS or the PUSCH.

With this arrangement, the transmission power control of the SRS can be performed irrespectively of the SRS transmission class in the terminal 300 and the base station 400, and therefore the table setting process in the terminal 300 and the base station 400 can be simplified.

SETTING EXAMPLE 2

In Setting Example 2, the table setting units 302 and 402 switch to the SRS TPC command table with respect to the SRS for CSI estimation. In other words, the table setting units 302 and 402 do not use the SRS TPC command table with respect to the SRS for beam sweeping. For the SRS for beam sweeping, the transmission power may be fixed to simplify the comparison of the received power between BPLs.

The terminal 300 references the switched TPC command table and uses the TPC command correction value ($\delta_{PUSCH}$ or $\delta_{SRS}$) corresponding to the TPC command information reported by the base station 400 to update the closed loop correction value for the SRS or the PUSCH.

With this arrangement, in the terminal 300 and the base station 400, closed loop control can be performed by using TPC command correction values with a large step size with respect to the SRS for CSI estimation used immediately after a BPL switch, and therefore the convergence time of the transmission power control can be shortened.

The above describes methods of setting the TPC command table depending on the SRS transmission class.

Next, methods of computing the closed loop correction value in the transmission power calculation unit 303 of the terminal 300 will be described.

Herein, the classes of downlink control information (DCI) format that trigger SRS transmission includes a format that indicates a downlink data channel (physical downlink shared channel (PDSCH)) and the SRS, a format that indicates the uplink data channel (PUSCH) and the SRS, and a format that indicates the SRS, for example.

The transmission power calculation unit 303 changes the method of computing the closed loop correction value according to a downlink control information format that triggers SRS transmission. Note that in the case of receiving a downlink control information format that does not trigger SRS transmission, the transmission power calculation unit 303 does not update the closed loop correction value in the transmission power control of the SRS.

Hereinafter, Computation Examples 1 and 2 of computing the closed loop correction value will be described specifically.

COMPUTATION EXAMPLE 1

The transmission power calculation unit 303 uses the TPC command correction value $\delta_{SRS}$ corresponding to the TPC command information (candidate value) received in the downlink control information (DCI) format in all format classes that trigger (indicate) SRS transmission to update the closed loop correction value for the SRS and compute the transmission power of the SRS.

With this arrangement, the terminal 300 can use the TPC command correction value $\delta_{SRS}$ corresponding to the TPC command information received in the downlink control information format in all format classes that indicate SRS transmission for closed loop control for the SRS, and shorten the convergence time in the transmission power control of the SRS.

COMPUTATION EXAMPLE 2

The transmission power calculation unit 303 uses the TPC command correction value $\delta_{SRS}$ corresponding to the TPC command information (candidate value) received in the downlink control information format in a subset of format classes that trigger (indicate) SRS transmission to update the closed loop correction value for the SRS and compute the transmission power of the SRS. On the other hand, the transmission power calculation unit 303 does not update the closed loop correction for the SRS using TPC command information received in downlink control information formats for SRS transmission classes other than the above subset of format classes.

For example, the subset of format classes for which the closed loop correction value update process is performed may include the format class that indicates the SRS and the format class that indicates the SRS and the PUSCH. Note that the TPC command information included in the downlink control information of the format class that indicates the SRS is expected to be used in the transmission power control of the SRS, while the TPC command information included in the downlink control information of the format class that indicates the SRS and the PUSCH is expected to be used in the transmission power control of the PUSCH, for example. Also, as described earlier, the SRS and the PUSCH share the same closed loop correction value $f_c(i)$. Therefore, by performing the process of updating the closed loop correction value of the SRS in the above subset of format classes, the terminal 300 can perform the transmission power control of the SRS appropriately.

On the other hand, the transmission power calculation unit 303 may also update the closed loop correction value for another uplink channel (for example, the PUCCH) in a format class other than the above subset of format classes, namely the format class that indicates the SRS and the PDSCH. Note that the TPC command information included in the downlink control information of the format class that indicates the SRS and the PDSCH is expected to be used in the transmission power control of the PUCCH, for example. Also, as described earlier, the PUCCH uses a different closed loop correction value $f_c(i)$ than the SRS (and the PUSCH). Therefore, by not performing the process of updating the closed loop correction value of the SRS in format classes other than the above subset of format classes, the terminal 300 can prevent unintended transmission power control with respect to the SRS.

In this way, by using the TPC command correction value included in a subset of format classes indicating the PUSCH and the SRS that share the same closed loop correction value $f_c(i)$ for SRS/PUSCH closed loop control, the convergence time in the transmission power control for the SRS can be shortened.

Note that the subset of format classes for which the closed loop correction value update process is performed is not limited to the format class that indicates the SRS and the PUSCH, and may also include the format class that indicates the SRS. Similar effects are obtained even in the above case.

The above respectively describes Computation Examples 1 and 2 of computing the closed loop correction value.

In this way, in the present embodiment, the terminal 300 performs closed loop control by switching between TPC command tables having different step sizes for the SRS and the PUSCH. Specifically, the terminal 300 performs closed loop control for the SRS using TPC command correction value with a larger step size than the PUSCH. With this arrangement, for example, the quality difference between the BPLs after a BPL switch can be corrected quickly in SRS transmission while still causing the closed loop control of the PUSCH to operate similarly to LTE. With this arrangement, according to the present embodiment, even in the case where a BPL switch occurs, a drop in the desired signal power or an increase in interfering power switch can be prevented, and the system performance can be improved.

Also, according to the present embodiment, and similarly to Embodiment 1, it is possible to correct the quality error immediately after a BPL switch in a short time without increasing the DCI signaling overhead, and perform appropriate transmission power control that accounts for beamforming.

The above describes exemplary embodiments of the present disclosure.

Note that a "beam" described above may be defined as follows.
(1) A transmission directional pattern (including analog beamforming) of the terminal 100 or 300
(2) A reception directional pattern (including analog beamforming) of the base station 200 or 400
(3) A combination (BPL) of a transmission directional pattern of the terminal 100 or 300 and a reception directional pattern of the base station 200 or 400
(4) The preceding matrix indicator (PMI)
(5) The codebook number Also, the foregoing embodiments describe transmission power control immediately after a BPL switch, but are not limited thereto. The present disclosure is applicable to cases in which the transmission conditions are switched dynamically and the error in the transmission power control increases immediately after a switch. For example, the foregoing embodiments are applicable when switching the active bandwidth part (BWP) and when switching the service type (such as eMBB and URLLC), and effects similar to the foregoing embodiments are obtained.

For example, in cases where the BWP (active BWP) with which to transmit the uplink channel is switched dynamically among a plurality of BWPs set in the same cell (or channel component), there is a possibility of increased transmission power control error caused by different interference levels among the BWPs. Therefore, similarly to the foregoing embodiments, by increasing the step size of the TPC command correction value immediately after an active BWP switch, an effect similar to the foregoing embodiments, namely an effect of quickly correcting the transmission power control error, is obtained.

Also, in cases where the service type is switched dynamically, there is a possibility of increased transmission power control error caused by switching the target received power dynamically according to the target quality of the service type. For example, the target received power of URLLC is set higher than the target received power of eMBB in some cases. Therefore, similarly to the foregoing embodiments, by increasing the step size of the TPC command correction value immediately after a service type switch, an effect similar to the foregoing embodiments, namely an effect of quickly correcting the transmission power control error, is obtained.

Also, the TPC command tables illustrated in FIGS. 9 to 12 and FIG. 15 are merely examples, and the number of candidate values (number of bits) of the TPC command information or the TPC command correction values associated with the TPC command information are not limited to the values illustrated in FIGS. 9 to 12 and FIG. 15.

The present disclosure is realizable by software, by hardware, or by software in cooperation with hardware. Each function block used in the description of the foregoing embodiments may be realized in whole or in part as an integrated circuit, that is, an LSI circuit. Each process described in the foregoing embodiments may be controlled in whole or in part, by a single LSI circuit or a combination of LSI circuits. An LSI circuit may include individual chips, or may include a single chip that contains some or all of the function blocks. An LSI circuit may also be provided with data inputs and outputs. LSI may also be referred to as an IC, system LSI, super LSI, or ultra LSI, depending on the degree of integration. The circuit integration methodology is not limited to LSI, and may be also be achieved with one or more special-purpose circuits, general-purpose processors, or special-purpose processors. Also, a field-programmable gate array (FPGA) capable of being programmed after fabrication of an LSI chip, or a reconfigurable processor whose circuit cell connections and settings inside an LSI chip may be reconfigured, may also be used. The present disclosure may be realized as digital processing or analog processing. Furthermore, if circuit integration technology that may be substituted for LSI appears as a result of progress in semiconductor technology or another derived technology, obviously the new technology may be used to integrate the function blocks. Biotechnology applications and the like are also a possibility.

A terminal of the present disclosure is provided with a circuit that calculates a transmission power of an uplink signal by using transmission power control information indicating one value from among a plurality of candidate values respectively associated with correction values that correct a control value to use in a closed loop control of the transmission power, and a transmitter that transmits the uplink signal with the transmission power, in which a first correction value and a second correction value having a larger step size than the first correction value are associated with each of the plurality of candidate values.

In a terminal of the present disclosure, within a predetermined period from a beam switch, the circuit computes the transmission power by using the second correction value corresponding to the candidate value indicated by the transmission power control information, and in a period outside the predetermined period, the circuit computes the transmission power by using the first correction value corresponding to the candidate value indicated by the transmission power control information.

In a terminal of the present disclosure, within a predetermined period from a beam switch between different transmission and reception points, the circuit computes the transmission power by using the second correction value corresponding to the candidate value indicated by the transmission power control information, and within the predetermined period from a beam switch at the same transmission and reception point, the circuit computes the transmission power by using the first correction value corresponding to the candidate value indicated by the transmission power control information.

In a terminal of the present disclosure, the second correction value further includes a third correction value and a fourth correction value having a larger step size than the third correction value. Within a predetermined period from a beam switch at the same transmission and reception point, the circuit computes the transmission power by using the third correction value corresponding to the candidate value indicated by the transmission power control information, and within the predetermined period from a beam switch between different transmission and reception points, the circuit computes the transmission power by using the fourth correction value corresponding to the candidate value indicated by the transmission power control information.

In a terminal of the present disclosure, the first correction value further includes a third correction value and a fourth correction value having a larger step size than the third correction value. Within a predetermined period from a beam switch, the circuit computes the transmission power by using the third correction value corresponding to the candidate value indicated by the transmission power control information in a case where a wide beam width is set in the terminal, and the circuit computes the transmission power by using the fourth correction value corresponding to the candidate value indicated by the transmission power control information in a case where a narrow beam width is set in the terminal.

In a terminal of the present disclosure, the uplink signal is an uplink data channel signal.

In a terminal of the present disclosure, the uplink signal is a sounding reference signal (SRS).

In a terminal of the present disclosure, the uplink signal is a sounding reference signal (SRS) used to estimate channel state information (CSI).

In a terminal of the present disclosure, the circuit computes the transmission power of the SRS by using the second correction value corresponding to the candidate value indicated by the transmission power control information received in all downlink control information formats that indicate transmission of the SRS.

In a terminal of the present disclosure, the circuit computes the transmission power of the SRS by using the second correction value corresponding to the candidate value indicated by the transmission power control information received in a subset of downlink control information formats that indicate transmission of the SRS.

In a terminal of the present disclosure, a class of the subset of downlink control information formats is a format class that indicates transmission of the SRS and an uplink data channel or a format class that indicates transmission of the SRS.

A base station of the present disclosure is provided with a circuit that generates transmission power control information indicating one value from among a plurality of candidate values respectively associated with correction values that correct a control value to use in a closed loop control of a transmission power of an uplink signal, and a receiver that receives the uplink signal transmitted with the transmission power, in which a first correction value and a second correction value having a larger step size than the first correction value are associated with each of the plurality of candidate values.

A transmission method of the present disclosure includes calculating a transmission power of an uplink signal by using transmission power control information indicating one value from among a plurality of candidate values respectively associated with correction values that correct a control value to use in a closed loop control of the transmission power, and transmitting the uplink signal with the transmission power, in which a first correction value and a second correction value having a larger step size than the first correction value are associated with each of the plurality of candidate values.

A reception method of the present disclosure includes generating transmission power control information indicating one value from among a plurality of candidate values respectively associated with correction values that correct a control value to use in a closed loop control of a transmission power of an uplink signal, and receiving the uplink signal transmitted with the transmission power, in which a first correction value and a second correction value having a larger step size than the first correction value are associated with each of the plurality of candidate values.

INDUSTRIAL APPLICABILITY

An embodiment of the present disclosure is useful in a mobile communication system.

REFERENCE SIGNS LIST

100, 300 terminal
101, 201 antenna
102, 202 wireless reception unit
103, 203 demodulation/decoding unit
104 BPL switching determination unit
105, 206 TPC command table control unit
106, 207 elapsed time measurement unit
107, 208, 302, 402 table setting unit
108, 303 transmission power calculation unit
109 data generation unit
110, 211 encoding/modulation unit
111, 209 resource allocation unit
112, 212 wireless transmission unit 200, 400 base station
204 scheduling unit
205 BPL switching unit
210 control information generation unit
301 SRS class determination unit
401 SRS transmission control unit

The invention claimed is:

1. A terminal comprising:
   circuitry, which, in operation, stores a plurality of candidate values, receives transmission power control information indicating one candidate value from among the plurality of candidate values, and calculates a transmission power of an uplink signal by using the transmission power control information; and
   a transmitter, which, in operation, transmits the uplink signal with the transmission power, wherein
   the plurality of candidate values are associated with a plurality of correction values that correct a control value to use in a closed loop control of the transmission power,
   the plurality of correction values includes a plurality of first correction values, and a plurality of second correction values that have a larger step size than the plurality of first correction values,
   each of the plurality of candidate values is associated with a first correction value of the plurality of first correction values, and a second correction value of the plurality of second correction values, and
   the transmission power is calculated using a first correction value associated with the one candidate value in response to a beam switch absence, and using a second correction value associated with the one candidate value in response to a beam switch presence.

2. The terminal according to claim 1, wherein,
   the circuitry, in operation, determines the beam switch presence within a predetermined period from a beam switch, and determines the beam switch absence in a period outside the predetermined period.

3. The terminal according to claim 1, wherein
   the circuitry, in operation, determines the beam switch presence within a predetermined period from a beam switch between different transmission and reception points, and determines the beam switch absence within the predetermined period from a beam switch at the same transmission and reception point.

4. The terminal according to claim 1, wherein
   each of the plurality of second correction values further includes a third correction value and a fourth correction value having a larger step size than the third correction value, and,
   within a predetermined period from a beam switch at the same transmission and reception point, the circuitry, in operation, computes the transmission power by using the third correction value corresponding to the one candidate value indicated by the transmission power control information, and,
   within the predetermined period from a beam switch between different transmission and reception points, the circuitry, in operation, computes the transmission power by using the fourth correction value corresponding to the one candidate value indicated by the transmission power control information.

5. The terminal according to claim 1, wherein
   each of the plurality of first correction values further includes a third correction value and a fourth correction value having a larger step size than the third correction value, and within a predetermined period from a beam switch, the circuitry, in operation, computes the transmission power by using the third correction value corresponding to the one candidate value indicated by the transmission power control information in a case where a wide beam width is set in the terminal, and the circuitry, in operation, computes the transmission power by using the fourth correction value corresponding to the one candidate value indicated by the transmission power control information in a case where a narrow beam width is set in the terminal.

6. The terminal according to claim 1, wherein
the uplink signal is an uplink data channel signal.

7. The terminal according to claim 1, wherein
the uplink signal is a sounding reference signal (SRS).

8. The terminal according to claim 1, wherein
the uplink signal is a sounding reference signal (SRS) used to estimate channel state information (CSI).

9. The terminal according to claim 7, wherein
the circuitry, in operation, computes the transmission power of the SRS by using the second correction value associated with the one candidate value, and
the transmission power control information is received in downlink control information formats that indicate transmission of the SRS.

10. The terminal according to claim 7, wherein
the circuitry, in operation, computes the transmission power of the SRS by using the second correction value associated with the one candidate value, and
the transmission power control information is received in a subset of downlink control information formats that indicate transmission of the SRS.

11. The terminal according to claim 10, wherein
a class of the subset of downlink control information formats is a format class that indicates transmission of the SRS and an uplink data channel or a format class that indicates transmission of the SRS.

12. A transmission method comprising:
storing a plurality of candidate values;
receiving transmission power control information indicating one candidate value from among the plurality of candidate values;
calculating a transmission power of an uplink signal by using the transmission power control information; and
transmitting the uplink signal with the transmission power, wherein
the plurality of candidate values are associated with a plurality of correction values that correct a control value to use in a closed loop control of the transmission power,
the plurality of correction values includes a plurality of first correction values, and a plurality of second correction values that have a larger step size than the plurality of first correction values,
each of the plurality of candidate values is associated with a first correction value of the plurality of first correction values, and a second correction value of the plurality of second correction values, and
the transmission power is calculated using a first correction value associated with the one candidate value in response to a beam switch absence, and using a second correction value associated with the one candidate value in response to a beam switch presence.

* * * * *